United States Patent
Cai et al.

(10) Patent No.: US 11,516,182 B2
(45) Date of Patent: Nov. 29, 2022

(54) FIREWALL RULES INTELLIGENCE

(71) Applicant: Google LLC, Mountain View, CA (US)

(72) Inventors: Kan Cai, Sunnyvale, CA (US); Vikas Aggarwal, Brisbane, CA (US); Gargi Adhav, San Jose, CA (US); Rajendra Yavatkar, Saratoga, CA (US); Ning Zhao, San Jose, CA (US); Vishal Gupta, Milpitas, CA (US)

(73) Assignee: Google LLC, Mountain View, CA (US)

( * ) Notice: Subject to any disclaimer, the term of this patent is extended or adjusted under 35 U.S.C. 154(b) by 307 days.

(21) Appl. No.: 16/845,771

(22) Filed: Apr. 10, 2020

(65) Prior Publication Data

US 2020/0329011 A1    Oct. 15, 2020

Related U.S. Application Data

(60) Provisional application No. 62/832,178, filed on Apr. 10, 2019.

(51) Int. Cl.

| | |
|---|---|
| *H04L 12/00* | (2006.01) |
| *H04L 9/40* | (2022.01) |
| *H04L 43/026* | (2022.01) |
| *H04L 41/16* | (2022.01) |
| *G06F 9/54* | (2006.01) |
| *G06N 20/00* | (2019.01) |
| *H04L 41/14* | (2022.01) |

(52) U.S. Cl.
CPC .......... *H04L 63/0263* (2013.01); *G06F 9/547* (2013.01); *G06N 20/00* (2019.01); *H04L 41/145* (2013.01); *H04L 41/16* (2013.01); *H04L 43/026* (2013.01); *H04L 63/1425* (2013.01)

(58) Field of Classification Search
CPC ........ G06N 5/046; G06N 20/00; G06F 9/547; H04L 41/145; H04L 63/1425; H04L 63/0263; H04L 41/16; H04L 43/026; H04L 63/08; H04L 63/20
USPC ............ 709/225, 224; 707/694, 783; 726/11
See application file for complete search history.

(56) References Cited

U.S. PATENT DOCUMENTS

| | | | | |
|---|---|---|---|---|
| 2008/0115205 A1* | 5/2008 | Aaron | ..................... | H04L 63/20 726/14 |
| 2011/0099482 A1* | 4/2011 | Koved | ..................... | H04L 67/02 715/741 |
| 2012/0297475 A1* | 11/2012 | Aaron | ..................... | H04L 63/20 726/11 |
| 2018/0211226 A1* | 7/2018 | Wieneke | ............. | G06Q 10/107 |

* cited by examiner

*Primary Examiner* — Frantz Coby
(74) *Attorney, Agent, or Firm* — Honigman LLP; Brett A. Krueger (57) ABSTRACT

A firewall intelligence system, includes a data storage storing a set of firewall rules for a network; a recommendation engine that receives, from a log service, traffic logs detailing traffic for the network and firewall logs detailing the usage of firewall rules in response to the traffic for the network, accesses, from the data storage, the set of firewall rules for the network; processes the set of firewall rules to evaluate the firewall rules against a set of quantitative evaluation rules to determine one or more firewall rule recommendations, wherein each firewall rule recommendation is a recommendation to change at least one of the firewall rules in the set of firewall rules; and a front end API that provides data describing the one or more firewall rule recommendations to a user device.

17 Claims, 6 Drawing Sheets

FIREWALL RULES INTELLIGENCE

CLAIM OF PRIORITY

This application claims priority under 35 USC § 119(e) to U.S. Patent Application Ser. No. 62/832,178, filed on Apr. 10, 2019, the entire contents of which are hereby incorporated by reference.

BACKGROUND

Enterprise users need to understand how well their firewall rules are configured and need to be able to maintain and adjust firewall rules. The complex nature of firewall rules makes it difficult for users to understand what rules are in use and what the effect of these rules are. One of the problems this creates is that it is difficult to maintain firewall rules over time. Rules which once made sense may not anymore as operating environments change. Moreover, there is a resistance to obsolete any existing rules due to the lack of understanding of how would the removal of the firewall rule would impact traffic. As a result, users often accumulate a larger and larger set of firewall rules, adding to the operational complexity.

This ever-increasing volume of firewall rules may result in thousands of rules, many of which the user may not even be aware of Another problem is over-granting by overly broad rules, leading to unnecessary security risks. A converse problem in under-granting by overly restrictive rules, leading to dropped traffic that should be allowed. Still other problems include outdated rules that should be deleted and duplicate rules with identical or overlapping effects. These problems may be difficult to identify and introduce significant complexity to security management.

SUMMARY

This document describes techniques, methods, systems, and other mechanisms for a Firewall Rules Intelligence (FRI) Service that guides customers in configuring their firewall rules securely, makes recommendations regarding firewall rules, and provides various analytical services regarding firewalls.

One innovative aspect of the subject matter described in this specification is embodied in a system including a data storage storing a set of firewall rules for a network; a recommendation engine that receives, from a log service, traffic logs detailing traffic for the network and firewall logs detailing the usage of firewall rules in response to the traffic for the network, accesses, from the data storage, the set of firewall rules for the network; processes the set of firewall rules to evaluate the firewall rules against a set of quantitative evaluation rules to determine one or more firewall rule recommendations, wherein each firewall rule recommendation is a recommendation to change at least one of the firewall rules in the set of firewall rules; and a front end API that provides data describing the one or more firewall rule recommendations to a user device. Other embodiments of this aspect include corresponding computer systems, apparatus, and computer programs recorded on one or more computer storage devices, each configured to perform the actions of the methods.

One or more advantages may be realized by implementing the FRI subject matter described below. A system implementing FRI guides customers in configuring their firewall rules securely. The complex nature of firewall rules makes it difficult for users to understand what rules are in use and what the effect of these rules are. The FRI system identifies such rules and their attendant problems for the user so the user may take action. The FRI system may also make recommendations based on either a machine-learned model or a rule-based model. These recommendations take into account the complex interplay of the firewall rules that a person cannot otherwise comprehend. Configuration changes may be pre-played with historical traffic, or may be analyzed with synthetic traffic, to validate a firewall rule change or identify problems the firewall rule change may introduce if committed. Moreover, recommendations can also be made for a configuration change. The pre-commit simulations and recommendations result in problem resolution before the commitment is made, which, in turn, results in better asset protection and reduced troubleshooting time.

Details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

The Firewall Rule Intelligence (FRI) system described in this specification enables users to understand the firewall rules that are in place for a network, understand how changes to the firewall rules will impact network traffic and other firewall rules, and better secure their networking environment.

When applied to firewall configurations, the FRI system provides a mechanism for analyzing an enterprise's firewall configurations (and identifying misconfigurations) and making recommendations for optimizing these configurations. In some implementations, the FRI analyzes the network configuration and network data-plane logs to identify a user's intent. For example, the FRI system may identify overlapping rules or rules that are never utilized and provide a report to the user detailing these rules, and also detailing suggestions. Based on the report and suggestions, the user may modify the rules accordingly to realize the user's intent. More specifically, the FRI system is able to provide users with near real-time statistics and make recommendations for optimizing their firewall configurations to match their intent and to improve security of their network.

The example FRI system described below may provide firewall utilization reports and firewall recommendations. The firewall utilization report provide users with visibility into various characteristics of their firewall usage over a period of time, such as hit count, details of virtual machines (VMs) or other assets that are being impacted by different firewall rules, traffic flows that are being subject to different firewalls, etc. The firewall recommendations are recommendations about firewall rules to optimize the network configuration and improve security. Examples of recommendations include suggestions for removal of firewalls that have been determined to be unreachable (shadowed by other firewalls), and suggestions from a machine-learned engine (or other recommendation engine, such as rule-based engine) for tightening and condensing of firewalls based on historical traffic patterns.

These features and additional features are described in more detail below. In the following description, VM assets are provided as example assets. However, the FRI system may be used for any collection or combination of assets, including instances that are not virtual.

Figure 1:
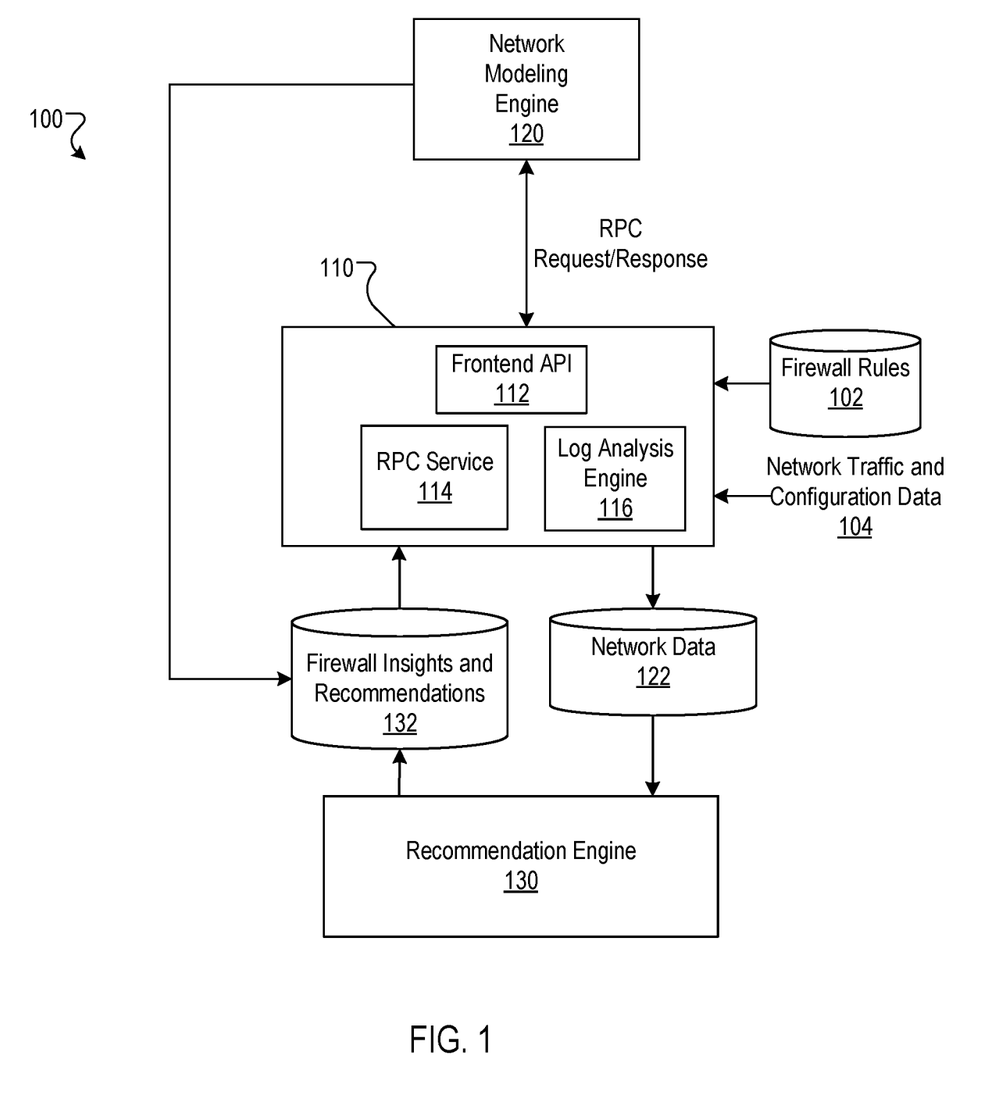
FIG. 1 is a block diagram of a Firewall Rules Intelligence system.

FIG. 1 is a block diagram 100 of a Firewall Rules Intelligence (FRI) system 100. The example architecture of FIG. 1 is illustrative, and other architectures that realize the functionality described below can also be used.

The FRI system 100 includes a frontend 110, which, in turn, includes a frontend API 112, a remote procedure call (RPC) service 114, and a log analysis engine 116. The frontend API 112 enables other devices, applications and services to interact with the FRI system 100. The RPC service 114 enables inter-component interactions. The log analysis engine 116 provides a variety of analysis functions, which are described in more detail below.

A recommendation engine 130, described in more detail below, is used to make firewall rule recommendations for the user. The recommendation engine may be rule-based or may be a machine learned model. The recommendation engine 130 captures a user's intent by processing the network and traffic flows, and then making recommendations to the user. The user then accepts or rejects the recommendations, or otherwise makes changes in response to the recommendations.

The network data 122 is generated by the log analysis engine 116. The network data 122 describes features of the firewall rules 102, features of a network to which the firewall rules are applied (e.g., configuration data), network traffic, and actions taken by the firewall rules. The network data 122 is described in more detail below. To generate the network data 122 and recommendations, The FRI system 100 uses a firewall logging service to log network traffic from network traffic and configuration data 104, and firewall rules 102. The log analysis engine 116 processes this information to generate the network data 122. Together the rules 102 and traffic provide details of firewall rules used by various traffic flows in a network. The FRI system 100 also reads snapshots of a network configuration from the configuration data 104 at periodic intervals. The network configuration provides details such as all the firewall rules present in a network, various VM instances present in a network, etc. To implement these features, the FRI system 100 receives a one-time reading of network configurations, as well as the updates as the network configurations evolve, and a historical state of the network configurations.

In operation, the FRI system 100 generates firewall insights and recommendations 132, and responses to various forms of network connectivity queries, for understanding and assessing the impact of various firewall rules. The insights and recommendations 132 are generated by the network modeling engine 120 and the recommendation engine 130, as described in more detail below.

Two particular capabilities of the FRI system 100 that enables such features are the identification of unreachable firewalls and unused firewalls. An unreachable firewall is a firewall configured according to a firewall rule that cannot be reached because the criteria for activation is covered by another firewall rule. For example, two firewalls may have overlapping match criteria for allowing/denying traffic to the same set of devices, such as VMs. In cases where a broader, first rule completely covers the matching criteria of another, second rule, the second firewall rule is said to be unreachable or shadowed by the first rule. In other words, no traffic will ever match the second rule as the first rule will preclude such traffic from ever activating the second rule. Such shadowed rules are safe to remove as they have no impact on the allowed/denied traffic. Alternatively, rules that shadow others may be too broad, and are candidates for adjustment to reduce their scope. More generally, shadowed rules indicate two kinds of problems: redundant rules that may need to be removed; and/or rules are too broad and that may need to be removed.

Table 1 below provides an example in which a second rule, rule-2, is shadowed by a first rule, rule-1. In particular, the first rule has a larger range of IP filters (10.2.0.0/16) that subsumes the range of IP filters for second rule (10.2.0.0/24).

TABLE 1

| Name | Type | Target | Filters | Protocol/ports | Action | Priority | Network |
| --- | --- | --- | --- | --- | --- | --- | --- |
| rule-1 | Ingress | Apply to all | Ip ranges: 10.2.0.0/16 | tcp | Allow | 10 | network1 |
| rule-2 | Ingress | tag1 | Ip ranges: 10.2.0.0/24 | tcp | Allow | 1000 | network1 |

Unused firewalls are firewalls that are configured according to rules that are superseded by other firewall rules. For example, in some cases users may have a set of "Allow" firewall rules that were added, but have not been hit by any traffic. While such firewalls are "reachable" based on the definition of an unreachable rule above, these firewalls have likely become obsolete, and hence have not seen any traffic hits. Users should consider unused firewall rules for removal to avoid unnecessary clutter or creating a hole that could be exploited by unauthorized traffic.

Finally, firewall logs detail the effects of individual firewalls according to their respective firewall rules on network traffic. The FRI system 100 ingests these firewall logs generated for a user's network, and performs analysis on them to generate utilization statistics, as well as recommendations. The use of firewall logs will be described in more detail below.

The FRI system 100 includes a network modeling engine 120. The network modeling engine 120 performs various kinds of static analysis such as a network connectivity determination of a given traffic flow to understand the impact of certain firewalls, and determination of shadowed/unreachable firewalls. The analysis is based on a set of logical rules that are applied to firewall rule parameters to determine firewall rule conflicts, shadows, and other logical errors.

For example, a traffic flow may be expressed as a 5-tuple data structure: <srcIP, dstIP, srcPort, dstPort, protocol>, where:

src_ip is a string specifying an ip address of the source;
dst_ip is a string specifying ip address of the destination;
src_port is an integer specifying a port for the source;
dst_port is an integer specifying a port of the destination; and
protocol is one of an enumerated protocol for packet.

For this given traffic flow tuple, the network modelling engine 120 can access the firewall rules to determine which firewall rule will be enacted and the action takes.

The network modeling engine 120 may also perform dynamic analysis, which involves pre-play of historical traffic on configuration changes detailing the changes on real traffic.

The log analysis engine 116 receives the firewall logs, and control-plane network configurations at periodic intervals, and performs correlation across those logs to generate network data 122 for the recommendation engine 130 and for user inquiry. Examples of such metrics include aggregated firewall hit counts, last hit timestamps, first hit time stamps, and firewall hit count by virtual machine or IP address.

The aggregated firewall hit counts specify, for each firewall rule, and aggregate hit count for that firewall based on various data connections. Each connection accounts for a single hit. A separate metric for each firewall rule can be determined.

The last hit timestamp is a timestamp indicating a time when the firewall rule was last hit by a traffic flow. Conversely, a first hit timestamp is a timestamp indicating a time when a firewall rule was first hit by a traffic flow.

A firewall hit count by virtual machine or IP address details the firewall hit counts for individual VMs or IPs. The metric may include all firewall rule hits for each VM/IP, or, in some implementations, the top firewall rule hits for traffic for each VM/IP.

The network data 122 is used to provide the recommendation engine 130 with necessary data to make recommendations. Should the recommendation engine 130 be a machine learned model, the network data 122 may also be used for training the recommendation engine 130. Example network data 122 may include a firewalls table, a virtual machine table, and a traffic table. The network data 122 described below is illustrative, and additional or different network data that describes features of the network, traffic and firewall rules may also be stored.

An example firewall table is shown in table 2 below. The firewall configurations are persisted with an associated timestamp representing the time when the snapshot of the network configuration was read.

TABLE 2

| Parameter name | Type | Description |
| --- | --- | --- |
| timestamp | integer | Timestamp expressed in seconds since the epoch, indicating the time when this record was updated |

TABLE 2-continued

| Parameter name | Type | Description |
| --- | --- | --- |
| network | string | Network name of the network containing firewall rules. |
| firewall | string | Name of firewall rule |
| firewallData | bytes | Firewall configuration stored as bytes and which specifies the firewall rule, what the rule does, and the conditions for invocation of the rule |

An example VM configuration table is shown in Table 3 below. The VM configurations are persisted with an associated timestamp representing the time when the snapshot of the network configurations was last read. Other assets besides VMs can also be listed according to the same data structure.

TABLE 3

| Parameter name | Type | Description |
| --- | --- | --- |
| timestamp | integer | Timestamp indicating the time when this record was updated |
| network | string | Network name of the network containing firewall rules. |
| instance | string | Name of the VM instance |
| tags | repeated | string - The tags associated with the VM |
| ips | repeated | string - The IP addresses associated with the VM |

An example traffic data table is shown in Table 4 below. The traffic data are persisted with an associated timestamp representing the time when the snapshot of the network configurations was read.

TABLE 4

| Parameter name | Type | Description |
| --- | --- | --- |
| timestamp | integer | Timestamp indicating the time when this record was updated |
| network | string | Network name of the network containing firewall rules. |
| instance | string | Name of the VM instance |
| localIp | string | IP address of the Local vm |
| localPort | int | Port number of the local vm |
| remoteIp | string | IP address of the remote destination |
| remotePort | int | Port number of the remote destination |
| protocol | int | Protocol of the traffic flow |
| ingressFirewallAction | bytes | Ingress firewall rule and action applied to the traffic |
| egressFirewallAction | bytes | Egress firewall rule and action applied to the traffic |

The network modeling engine 120 models the network for which the network data 122 is collected to perform firewall rules analysis, which are described in more detail below. The network modeling engine 120 is also used to provide query responses, either initiated by the user or by another service (such as the recommendation engine 130), to show unreachable or shadowed firewalls, unused firewalls, and firewall actions. Example queries and responses are shown in Tables 5A, 5B, 6A, 6B, 7A and 7B below.

Tables 5A and 5B illustrate a query for unreachable firewalls and a response. The queries specifies a given network. The network modeling engine 120 determines, for the network, the unreachable or shadowed firewalls.

Request

TABLE 5A

| Parameter name | Type | Description |
| --- | --- | --- |
| network | string | [repeated] The name of the networks containing firewall rules. If not specified the data for all firewall rules in all networks in a project will be returned. |
| options | Customized message | It contains common settings on how to access project configuration and manage the data plane model in the future (such as caching and refreshing). This field is Optional and usually do not need to be set. |

Response

TABLE 5B

| Field Name | Type | Description |
| --- | --- | --- |
| project | string | Project ID for this request. |
| version | integer | Timestamp expressed in seconds since the epoch, for the time when this analysis was done. This is used to determine the time when a snapshot of network configurations was taken, in case of changing configurations. |
| unreachableFirewallSet | repeated | Details of unreachable firewalls for each network.<br>network: string - name of the network<br>unreachableFirewalls: repeated - list of unreachable firewalls in a network<br>    firewall: string - name of firewall that is unreachable<br>    cause: enum - reason for unreachability UNKNOWN/SHADOW/. . .<br>    resources: repeated string - name of resources (e.g., other firewall rules or network device(s)) causing unreachability. |

Tables 6A and 6B illustrate a query for unused firewalls. For a given network specified by the query, the results provide insights about all firewall rules that are unused. The set of unused firewalls may also include the set of firewalls that are deemed unreachable, as they would likely have no traffic. Note, however, that an unused firewall is not necessarily an unreachable firewall.

Request

TABLE 6A

| Parameter name | Type | Description |
| --- | --- | --- |
| network | string | The name of the networks containing firewall rules. If not specified the data for all firewall rules in all networks in a project will be returned. |
| duration | int32 | Duration in days representing the minimum trailing period over which firewall rule haven't been used. If not specified, default is 30 days. Only firewall rules that have not been used in the trailing period specified are returned. |

Response

TABLE 6B

| Field Name | Type | Description |
| --- | --- | --- |
| version | integer | Timestamp expressed in seconds since the epoch, for the time when this analysis was done. This is used to determine the time when a snapshot of network configurations was taken, in case of changing configurations. |

TABLE 6B-continued

| Field Name | Type | Description |
| --- | --- | --- |
| unusedeFirewallSet | repeated | Details of unused firewalls for each network.<br>network: string - name of the network<br>unusedeFirewalls: repeated - list of unused firewalls in a network<br>    firewall: string - name of firewall that is unused |

Tables 7A and 7B illustrate a query for firewall actions and a response. The query is a 5-tuple<srcIP, dstIP, srcPort, dstPort, protocol>traffic parameter. The network modeling engine 120 accesses the network data 122 to determine which firewall rules will be applied, and what action outcome the applied rules will have.

Request

TABLE 7A

| Parameter name | Type | Description |
| --- | --- | --- |
| network | string | The name of the network containing firewall rules. If not specified the data for all firewall rules in all networks in a project will be returned. |
| packet | singular | src_ip: string - ip address of the src<br>dst_ip: string - ip address of the dst<br>src_port: integer - port for the src<br>dst_port: integer - port for the dst<br>protocol: enum - protocol for packet |

Response

TABLE 7B

| Field Name | Type | Description |
| --- | --- | --- |
| version | integer | Timestamp for the time when this analysis was done. This is used to determine the time when a snapshot of network configurations was taken, in case of changing configurations. |
| hitFirewallUrl | repeated, string | The URL of the firewall rule being hit. |
| action | enum | ALLOW/DENY - the action taken by the firewall rule |

The recommendation engine 130 is used to make recommendations regarding firewall rules. The recommendation engine 130 may be a rule-based engine, or, alternatively, may be a machine learned model that is trained on network data.

The recommendation engine 130 determines the current firewall rule configurations the current firewall and VM configurations from the network data 122. For each firewall rule, the recommendation engine 130 also takes in the traffic that hits each firewall rule over a period of time (e.g., trailing 60 days, or some other historical time period).

In some implementations, the FRI system 100 (either by use of the modeling engine 120 or the recommendation engine 130, or both) flattens the firewall rule into mutually exclusive sub-rules and determines the utilization of each sub-rule by associating it with the traffic logs. Rules are composed of several attributes: Source IP Ranges, Source Tags, Source Service Accounts, Target Tags, Target Service Accounts, IP Protocols, and Port Ranges. There can be multiple values for each attribute type. A connection will be allowed by a firewall, as long as it satisfies one value from (Source IP Ranges, Source Tags, Source Service Accounts), one value from (Target Tags, Target Service Accounts), one value from IP Protocols and one value from Port Ranges. Therefore, a firewall allow action can be defined as follows:

$$\text{Allow}(R,C)=\text{Allow}(SR\_0,C) \vee \text{Allow}(SR\_1,C) \vee \ldots \vee \text{Allow}(SR\_n,C);$$

where
R: the original rule;
C: a connection for which the rule is being applied; and
SR_0 to SR_n: all possible sub-rule 3-tuples derived from R with for source, target, port_range); where
source∈(Source IP Ranges, Source Tags, Source Service Accounts);
target∈(Target Tags, Target Service Accounts); and
port_ranges∈Port Ranges With this definition, a rule will allow a connection if at least one sub-rule is satisfied.

While a rule-level utilization analysis would identify which firewall rules are being actively used, the rule-level analysis cannot guarantee that every sub-rule is used. This is because sub-rules are in an OR-relationships with each other to establish the complete firewall rule. In some situations, this may be problematic because there could be rules that are broader than necessary and may allow unwanted connections in the future. To detect this problem, in some implementations the FRI system 100 analyzes at the sub-rule level. At the sub-rule level, the recommendation engine 130 determines which sub-rules are actually hit and consequently which attributes are needed.

Although sub-rule level hit counts are more useful than rule level counts, they are not sufficient to take action on rules. A sub-rule might have 0 hits today, but it does not mean that it will not be needed in the future. Therefore even with sub-rule level utilization information, it is not easy for network administrators to decide if an existing firewall rule needs modification. Thus, the recommendation engine 130 derives sub-rule and attribute level insights from sub-rule level utilization information based on predictions of how likely a certain attribute value will be hit in the future. These predictions are based on historical sub-rule utilization patterns. In this way, unneeded attributes may be safely deduced and reported to users so that they can make informed decisions to tighten their firewall rules. More specifically, in implementations in which the recommendation engine 130 is a machine learned model, an inference will predict the probability that each sub-rule will be hit (and thus utilized) in the future. The recommendation engine 130 will recommend changes to prune those obsolete sub-rules.

The FRI system can thus quantitatively determine, for each firewall rule, whether it is an unreachable rule, and unused rule, and likelihood of the firewall rule being used in the future. Each of these determinations may considered a quantitative evaluation rule that can be used to determine recommendations for the user.

Figure 2:
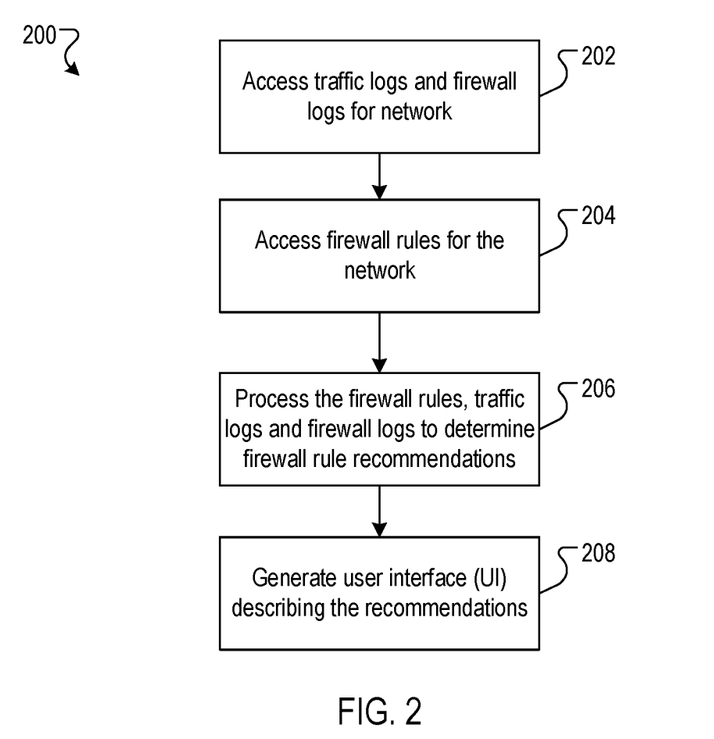
FIG. 2 is a flow diagram of an example process for providing firewall recommendations.

FIG. 2 is a flow diagram of an example process 200 for providing firewall recommendations. The process 200 is implemented in one or more computers that are used to realize the FRI system 100.

The process 200 accesses traffic logs and firewall logs for the network (202) and accesses firewall rules for the network (204). The traffic logs describe historical network traffic for the network, and the firewall logs describe firewall rule hits for firewall rules that were applied to the network traffic. For example, as described above, the log analysis engine 116 may process the firewall rules 102, network traffic and configuration data 104, and other data describing the firewall rules 102, the network, traffic, and actions taken in response to the firewall rules. The log analysis engine processes these data to generate the network data 122. The network data 122 may include the data described in tables 2-4 above.

The process 200 processes the firewall rules, traffic logs and firewall logs to determine firewall rule recommendations (206). For example, the recommendation engine 130 may process the network data 122 to provide recommendations, and, optionally, other information, to the user. Such recommendations may include firewall rule configuration changes from an existing configuration, e.g., deleting unreachable rules or adjusting rules that are shadowing other rules, adjusting firewall rules that are precluding traffic flow between certain endpoints when the endpoints are specified as a critical communication path, and so on.

The process 200 generates a user interface describing the recommendations (208). For example, the frontend API 112 may provide data to a user device in a format that is to be rendered in a user interface on the user device. The user may take one or more actions through the FRI system 100 in response to the recommendations.

Figure 3:
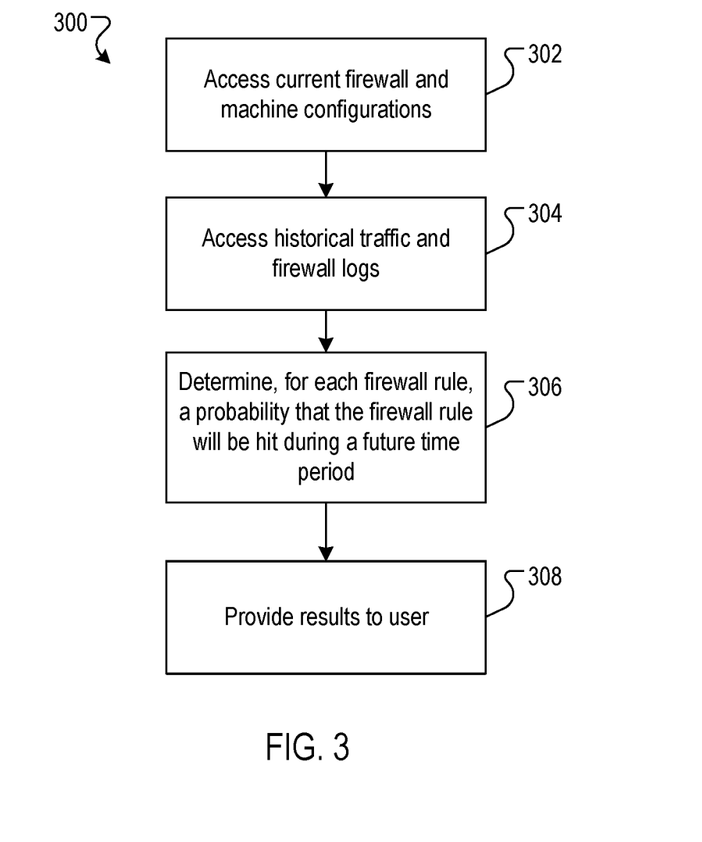
FIG. 3 is a flow diagram of an example process providing firewall predictions and statistics.

FIG. 3 is a flow diagram of an example process 300 providing firewall predictions and statistics. The process 300 is implemented in one or more computers that are used to realize the FRI system 100.

The process 300 accesses current firewall and machine configurations (302). For example, the recommendation engine 130 may access the network data 122, which describes the current firewall rules and machine configurations.

The process 300 accesses historical traffic and firewall logs (304). For example, the recommendation engine 130 may access the network data 122, which includes traffic data and data describing historical activity of the firewall rules.

The process 300 determines, for each firewall rule, a probability that the firewall rule will be hit (activated) during a future time period (306). The recommendation engine 130, for example, may make predictions that each firewall rule will be activated during a future time period. The recommendation engine 130 may have been trained to make such predictions based on historical data.

The process 300 provides results to the user (308). For example, the frontend API 112 may provide data to a user device in a format that is to be rendered in a user interface on the user device. The data describes the probabilities found in step 306, e.g., firewalls that are likely to not be used. The data may also describe sub-rules of firewall rules that are predicted to not be hit and that are predicted to be hit. Recommendations based on these probabilities may also be provided. The user may take one or more actions through the FRI system 100 in response to the recommendations.

Figure 4:
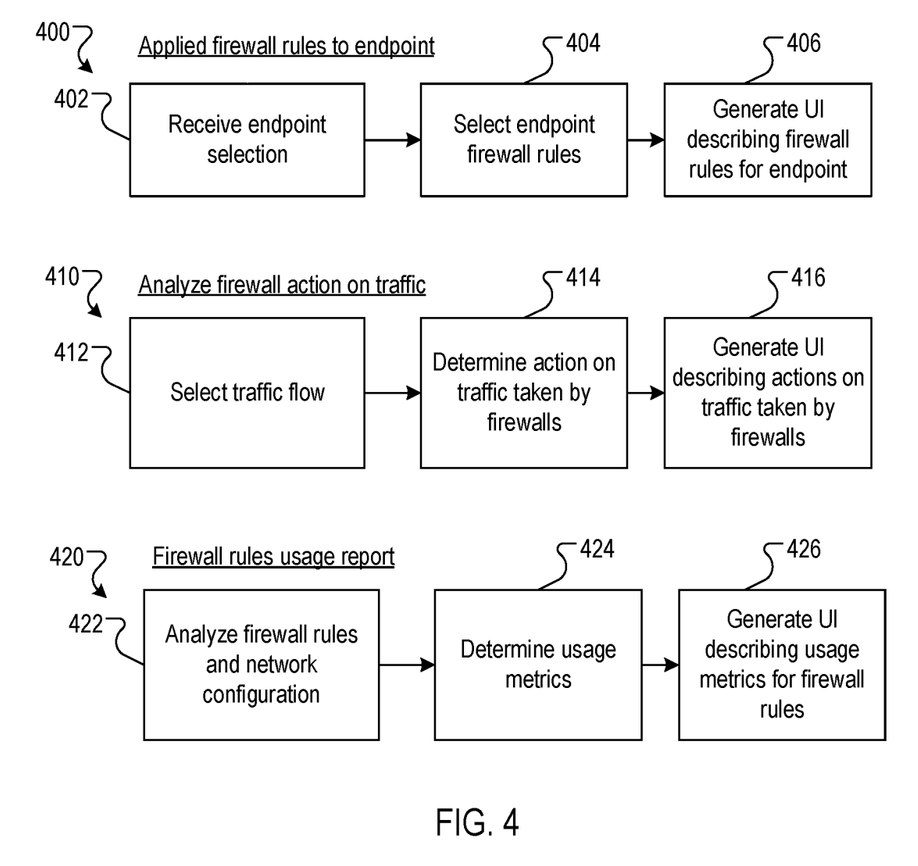
FIG. 4 are flow diagrams of example processes for generating usage reports for users.

FIG. 4 are flow diagrams of example processes 400, 410 and 420 for generating usage reports for users. The processes 400, 410 and 420 are implemented in one or more computers that are used to realize the FRI system 100.

The process 400 describes a static firewall configuration change simulation. A static simulation does not involve replaying of actual network traffic. Instead, a static simulation takes into account a firewall rule change and does a multi-endpoint analysis based on the existing firewall rules and the rule change.

The process 400 allows a user (or a requesting system) to determine which, if any, firewall rules apply to a particular endpoint. By use of the API 112, a user (or a requesting system) may determine all firewall rules that apply to the endpoint.

The process 400 receives an endpoint selection (402). For example, a particular VM or IP address is specified.

The process 400 selects endpoint firewall rules (404). For example, the network modeling engine 120 accesses the firewall rules tables to determine which rules apply to the endpoint.

The process 400 then generates a user interface (UI) describing the firewall rules determined for the endpoint. Firewall rules for the endpoint may also be flagged and shadowed or unused. In the case of the former, the flagged rule may be selected to determine which rule is shadowing the shadowed rule.

The process 410 provides the ability to analyze the action of firewall rules on specified traffic flows. The process 410 receives, as input, a traffic flow (412). The input, for example, is a traffic flow tuple, e.g., <srcIP, dstIP, srcPort, dstPort, protocol>.

The process 410 determines actions, if any, taken by firewalls (414). For example, the network modeling engine 120 may rely on historical data to search for a flow in the traffic flow table (table 4 above). If the flow is found as a table entry, then the resulting actions taken (if any) are determined from the entry. Conversely, if the flow is not found as a table entry, then the network modeling engine 120 may perform a static analysis on the traffic flow (such as described with reference to FIG. 5 below), or, alternatively, may invoke the recommendation engine 130 to predict which, if any, firewall rules will be applied to the traffic flow.

The process 410 then generates a UI describing the action taken for the traffic flow (e.g., allowed, denied) and, optionally, the firewall rule(s) hit for the traffic flow. Firewall rules for the traffic flow may also be flagged and shadowed or unused. In the case of the former, the flagged rule may be selected to determine which rule is shadowing the shadowed rule.

The process 420 provides firewall usage reports to a user. Counts are generated to show that when rules are invoked, when not invoked, and the like, based on simulated traffic, or, alternatively, historical traffic. Simulated traffic, however, can ensure that each endpoint and combinations of endpoints are processed to provide a more robust traffic analysis. Thus, by use of tuple, traffic can be simulated and the actions taken or not taken by the firewall rules, and which rules are invoked, can be logged, processed and displayed to the user. Such analysis may be especially useful when certain applications are failing due to timeouts, indicating that one or more firewall rules may be blocking traffic to or from the application.

The process 420 analyzes firewall rules and a network configuration. For example, the network modeling engine 120 may analyze the firewall rules 102 and the network configuration data (422) to determine the firewall rules applied to the network defined by the network data.

The process 422 determines usage metrics (424). For example, the network modeling engine 120 may simulate traffic to and from endpoints and between endpoints of the network, and determine which rules are hit by the simulated traffic, e.g., by processing firewall rule logs that are generated in response to the simulated traffic. Alternatively, the network modeling engine 120 may determine usage metrics from firewall logs generated from actual historical traffic.

The process 422 generates a US describing the usage metrics for firewall rules (426). In some implementations, the usage metrics may be detailed in list that shows, for each firewall rule, the firewall rule name, a hit count specifying the number of times the firewall has been hit over a period of time (e.g., the last 30, 60 or 90 days), and the last time the firewall rule was hit. In some implementations, each list entry is selectable, and clicking on the firewall rule name surfaces a firewall rule details page of the particular firewall rule, which provides more detailed information, such as rule parameters, owner, and the like.

Other metrics that can be determined and provided to a user include top N allowed rules; top N denied rules; unused rules, bottom N allowed rules, and down trending rules. The top N allowed rules shows the list of top N, e.g., top 10, allow firewall rules along with the hit count. This report can help the user understand the traffic access patterns by showing which allow firewall rules are heavily used. The top N denied rules shows a list of top N denied firewall rules along with the hit count. This report can help the user understand attack patterns by showing which deny firewall rules are heavily used. The top unused rules shows the list of allow/deny firewall rules that are not used by traffic (zero hit count) in a network. This list could be used to remove or modify the firewall rules that have zero hit counts in the last 30/60/90 days. The down trending rules shows a list of allow/deny firewall rules that have non-zero hit count, but have a last hit time greater than a down trending threshold—e.g., a last hit time greater than 30/60/90 days.

The above list of reports are not limiting, and the FRI system 100 can also be used to generate other report types.

Figure 5:
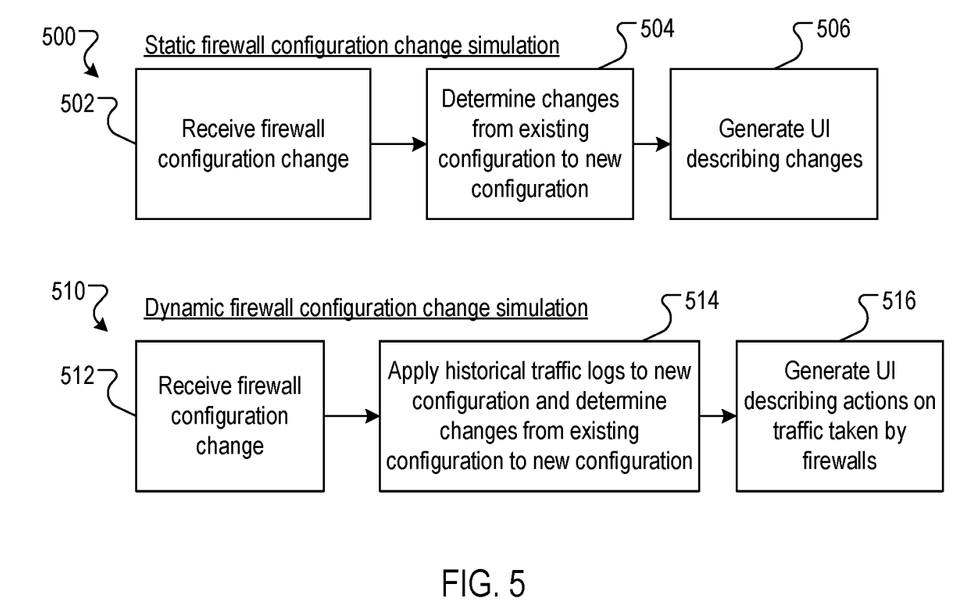
FIG. 5 are flow diagrams of example processes for simulating firewall changes.

FIG. 5 are flow diagrams of example processes 500 and 510 for simulating firewall changes. The processes 500 and 510 are implemented in one or more computers that are used to realize the FRI system 100.

The process 500 describes a static firewall configuration change simulation. A static simulation does not involve replaying of actual network traffic. Instead, a static simulation takes into account a firewall rule change and does a multi-endpoint analysis based on the existing firewall rules, the rule change, and synthetic traffic data generated by the network modeling engine to simulate traffic between endpoints. A static analysis may be used, for example, to evaluate a firewall rule configuration change to make sure that the configuration changes do block or allow intended traffic flows, but that they do not have unintended consequences. The network modeling engine 120 creates network traffic flow simulations from various sources and destinations and of various types to determine the effects of the changes on the firewall systems.

The process 500 receives a firewall configuration change (502). For example, a user may specify to add, modify or delete a firewall rule as the change.

The process 500 determines changes from the existing configuration to the new configuration (504). The changes not only include changes to the firewall rules, but also changes to actions taken on the network by the firewall rules as a result of the configuration change. In some implementations, the changes may be expressed and difference changes, which details traffic flows that were allowed before the change and that will be denied after the change, and vice versa.

A variety of other quantitative metrics can be specified by the user for testing against quantitative evaluation rules. One such metric is specifying a "never break path" to ensure that the new configuration does not impact the path. Another metric is specifying traffic filters in the simulation, such as IP ranges or port ranges, so that the difference analysis of the static simulation is only targeted for the traffic filters applied.

The process 500 generates a UI describing the changes (506). The UI details the changes described above. The description of the changes will include the difference changes described above.

The process 510 describes a dynamic firewall configuration change simulation. Dynamic analysis involves pre-play of configuration changes detailing the changes on real traffic. Data describing real historical traffic is stored in logs. The historical traffic data is accessed and used to "replay" the traffic for a new configuration, resulting in a "pre-play" of the new configuration on real (albeit historical) traffic. This results in the application of a new configuration of firewall rules on actual traffic, but as a simulation.

The process 510 receives a firewall configuration change (512). For example, a user may specify to add, modify or delete a firewall rule as the change.

The process 510 applies historical traffic logs to the new configuration and determines changes from the existing configuration to the new configuration (514). In some implementations, the changes may be expressed and difference changes, which details traffic flows that were allowed before the change and that will be denied after the change, and vice versa. Additional changes can also be analyzed, as described above with reference to step 504.

The process 510 generates a UI describing the changes (516). The UI details the changes described above.

Figure 6:
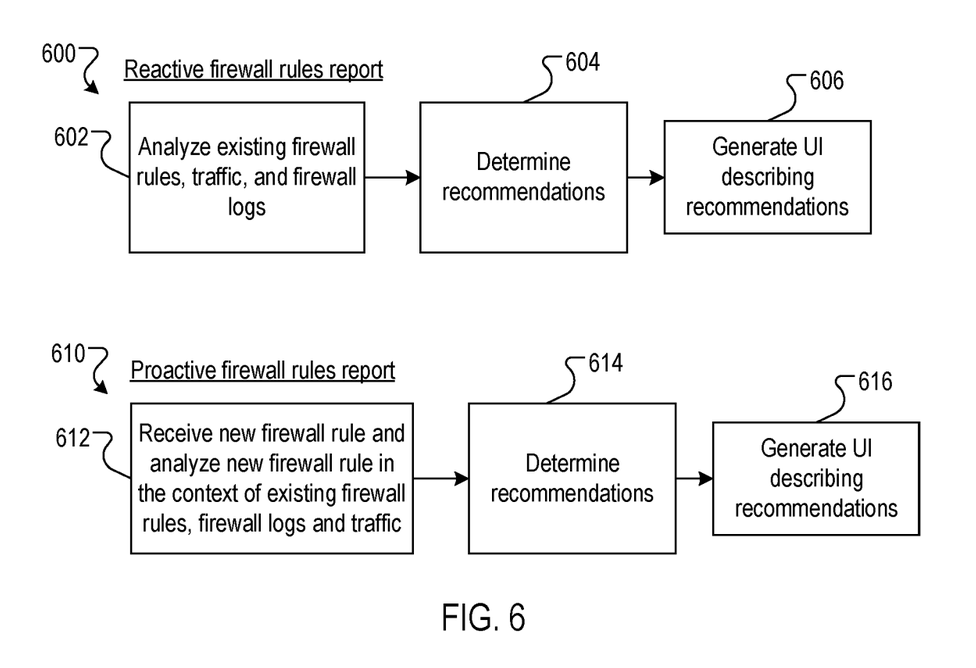
FIG. 6 are flow diagrams of example processes for generating firewall reports for firewall changes.

FIG. 6 are flow diagrams of example processes 600 and 610 for generating firewall reports for firewall changes. The processes 600 and 610 are implemented in one or more computers that are used to realize the FRI system 100.

The process 600 is a process for generating a reactive firewall rules report. A reactive report is a report that is generated after a firewall rules configuration is in place and operational. For example, a reactive report may be generated weekly (or some other periodic interval, or on demand) for an enterprise.

The process 600 analyzes existing firewall rules, traffic and firewall logs (602). For example, the log analysis engine may generate the network data 122, and the recommendation engine 130 may receive the data as input.

The process 600 determines recommendations (604). The recommendation can be based on any of the findings above, and can include any of the recommendations described above. For example, firewall rules not hit for more than a deletion threshold (e.g., 90 days) may be recommended for removal; firewalls impacting critical paths may be recommended for removal; firewalls that shadow other firewalls may be recommended for adjustment; firewalls that are predicted to not be hit may be recommended for removal or adjustments; assets that are unprotected may be recommended for a firewall rule, and the like.

The process 600 generates a UI describing the recommendations (606). The UI details the recommendations described above. Additionally, the UI may describe one or more of the following: what is the difference between the existing and the "recommended" configuration; what is the reason for every recommended configuration, e.g., rules not used result in a delete recommendation; conflicting rules result in a conflict resolution recommendation; shadowing of a rule results in a recommendation to adjust rules so the rule is no longer shadowed; the rule overrides a higher priority rule; the rule has not been used for an extended time period; etc.

Recommendations can be based on rule analysis, heuristics, and a machine learned process.

The process 610 describes a process for generating a proactive firewall rules report. A proactive report is a report that is generated before a firewall rules configuration change is committed. For example, a proactive report may be generated prior to committing a firewall configuration change.

The process 610 receives the new firewall rule and analyze new firewall rule in the context of existing firewall rules, firewall logs and traffic (612). For example, network modeling engine 130 may perform static and/or dynamic analysis on the change, and the recommendation engine may predict impacts based on the rule changes.

The process 600 determines recommendations (614). The recommendations may be similar to the recommendations described with reference to step 604 above.

The process 600 generates a UI describing the recommendations (616). The UI and its features may be similar to the UI as described with reference to step 616 above.

Figure 7:
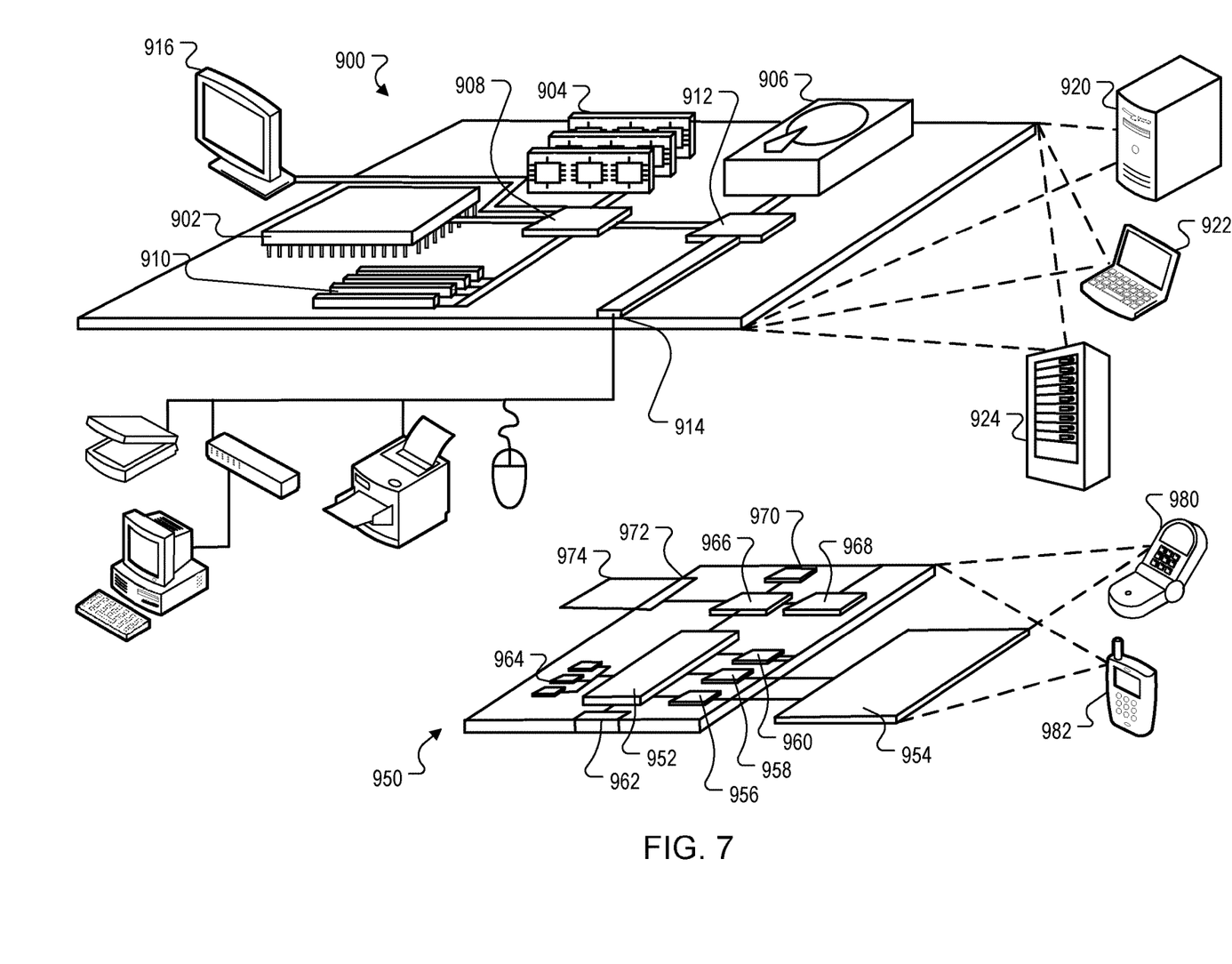
FIG. 7 is a block diagram of computing devices that may be used to implement the systems and methods described in this document.

FIG. 7 is a block diagram of computing devices 900, 950 that may be used to implement the systems and methods described in this document, as either a client or as a server or plurality of servers. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chip set of chips that include separate and multiple analog and digital processors. Additionally, the processor may be implemented using any of a number of architectures. For example, the processor 910 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provided as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Additionally computing device 900 or 950 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A system, comprising:
   a data storage storing a set of firewall rules for a network;
   a recommendation engine that:
      receives, from a log service, traffic logs detailing traffic for the network and firewall logs detailing usage of the set of firewall rules in response to the traffic for the network;
      accesses, from the data storage, the set of firewall rules for the network;
      processes the set of firewall rules to evaluate the firewall rules against a set of quantitative evaluation rules to determine one or more firewall rule recommendations, wherein each firewall rule recommendation is a recommendation to change at least one of the firewall rules in the set of firewall rules; and
   a front end API that provides data describing the one or more firewall rule recommendations to a user device, wherein the recommendation engine comprises a machine learned recommendation engine that:
      predicts a likelihood of at least one firewall rule of the set of firewall rules being hit during a future time period; and
      generates, in response to the likelihood, at least one of the one or more firewall rule recommendations.

2. The system of claim 1, further comprising a network modeling engine and wherein the recommendation engine determines, based on the network modeling engine, whether the set of firewall rules preclude traffic flow from at least a pair of endpoints.

3. The system of claim 1, further comprising a network modeling engine that performs a static analysis of endpoints in the network, the static analysis comprising:
   determining endpoints within the network based on network data;
   generating synthetic traffic for each endpoint;
   for each endpoint, determining firewall rules that apply to the endpoint and that are hit in response to the synthetic traffic; and logging each hit of a firewall rule in response to the synthetic traffic.

4. The system of claim 3, wherein generating synthetic traffic for each endpoint includes generating synthetic traffic between endpoint pairs in the network.

5. The system of claim 1, further comprising a network modeling engine that performs a dynamic analysis of endpoints in the network, the dynamic analysis comprising:
   determining endpoints within the network based on network data;
   access a network traffic log that logs historical network traffic for the network and replaying the historical network traffic against the firewall rules;
   for each endpoint, determining firewall rules that apply to the endpoint and that are hit in response to the replay of the historical network traffic; and
   logging each hit of a firewall rule in response to the reply of the historical network traffic.

6. The system of claim 1, wherein determining the one or more firewall rule recommendations comprises:
   identifying a first firewall rule shadowing a second firewall rule; and
   recommending to adjust the first firewall rule that shadows the second firewall rule so that the second firewall rule is not shadowed by the first firewall rule.

7. The system of claim 1, wherein determining the one or more firewall rule recommendations comprises:
   identifying a first firewall rule shadowing a second firewall rule; and
   recommending to delete the second firewall rule.

8. The system of claim 1, wherein:
   each firewall rule is expressed as a combination of sub-rules; and
   for each sub-rule for a firewall rule, the recommendation engine predicts a likelihood of the sub-rule of the firewall rule being hit during a future time period; and
   generates for the firewall rule, in response to the likelihoods of each sub-rule, a recommendation for the firewall rule.

9. The system of claim 1, wherein determining the one or more firewall rule recommendations comprises:
   identifying unused firewall rule; and
   recommending to adjust or delete the unused firewall rule.

10. A computer-implemented method, comprising:
    receiving, from a log service, traffic logs detailing traffic for a network and firewall logs detailing usage of a set of firewall rules in response to the traffic for the network;
    accessing the set of firewall rules for the network;
    processing the set of firewall rules to evaluate the firewall rules against a set of quantitative evaluation rules to determine one or more firewall rule recommendations by:
      predicting a likelihood of a firewall rule being hit during a future time period; and
      generating, in response to the likelihood, at least one of the one or more firewall rule recommendations, wherein each firewall rule recommendation is a recommendation to change at least one of the firewall rules in the set of firewall rules; and
    providing data describing the one or more firewall rule recommendations to a user device.

11. The computer-implemented method of claim 10, further comprising performing a static analysis of endpoints in the network, the static analysis comprising:
    determining endpoints within the network based on network data;
    generating synthetic traffic for each endpoint;
    for each endpoint, determining firewall rules that apply to the endpoint and that are hit in response to the synthetic traffic; and
    logging each hit of a firewall rule in response to the synthetic traffic.

12. The computer-implemented method of claim 11, wherein generating synthetic traffic for each endpoint includes generating synthetic traffic between endpoint pairs in the network.

13. The computer-implemented method of claim 10, further comprising performing a dynamic analysis of endpoints in the network, the dynamic analysis comprising:
    determining endpoints within the network based on network data;
    access a network traffic log that logs historical network traffic for the network and replaying the historical network traffic against the firewall rules;
    for each endpoint, determining firewall rules that apply to the endpoint and that are hit in response to the replay of the historical network traffic; and
    logging each hit of a firewall rule in response to the reply of the historical network traffic.

14. The computer-implemented method of claim 10, wherein determining the one or more firewall rule recommendations comprises:
    identifying a first firewall rule shadowing a second firewall rule; and
    recommending to adjust the first firewall rule that shadows the second firewall rule so that the second firewall rule is not shadowed by the first firewall rule.

15. The computer-implemented method of claim 10, wherein determining the one or more firewall rule recommendations comprises:
    identifying a first firewall rule shadowing a second firewall rule; and
    recommending to delete the second firewall rule.

16. The computer-implemented method of claim 10, wherein determining the one or more firewall rule recommendations comprises:
    expressing each firewall rule as a combination of sub-rules;
    for each sub-rule for a firewall rule, predicting a likelihood of the sub-rule of the firewall rule being hit during a future time period; and
    generating for the firewall rule, in response to the likelihoods of each sub-rule, a recommendation for the firewall rule.

17. A non-transitory computer readable medium storing instructions executable by a data processing apparatus and that cause the data processing apparatus to perform operations comprising:
    receiving traffic logs detailing traffic for a network and firewall logs detailing usage of a set of firewall rules in response to the traffic for the network;
    accessing the set of firewall rules for the network;
    processing the set of firewall rules to evaluate the firewall rules against a set of quantitative evaluation rules to determine one or more firewall rule recommendations by:
      predicting a likelihood of a firewall rule being hit during a future time period; and
      generating, in response to the likelihood, at least one of the one or more firewall rule recommendations, wherein each firewall rule recommendation is a recommendation to change at least one of the firewall rules in the set of firewall rules; and providing data describing the one or more firewall rule recommendations to a user device.

* * * * *